June 22, 1971 J. L. MENNITT 3,586,491
MOLD COOLING APPARATUS FOR GLASS FORMING MACHINE
Filed April 23, 1969 6 Sheets-Sheet 3
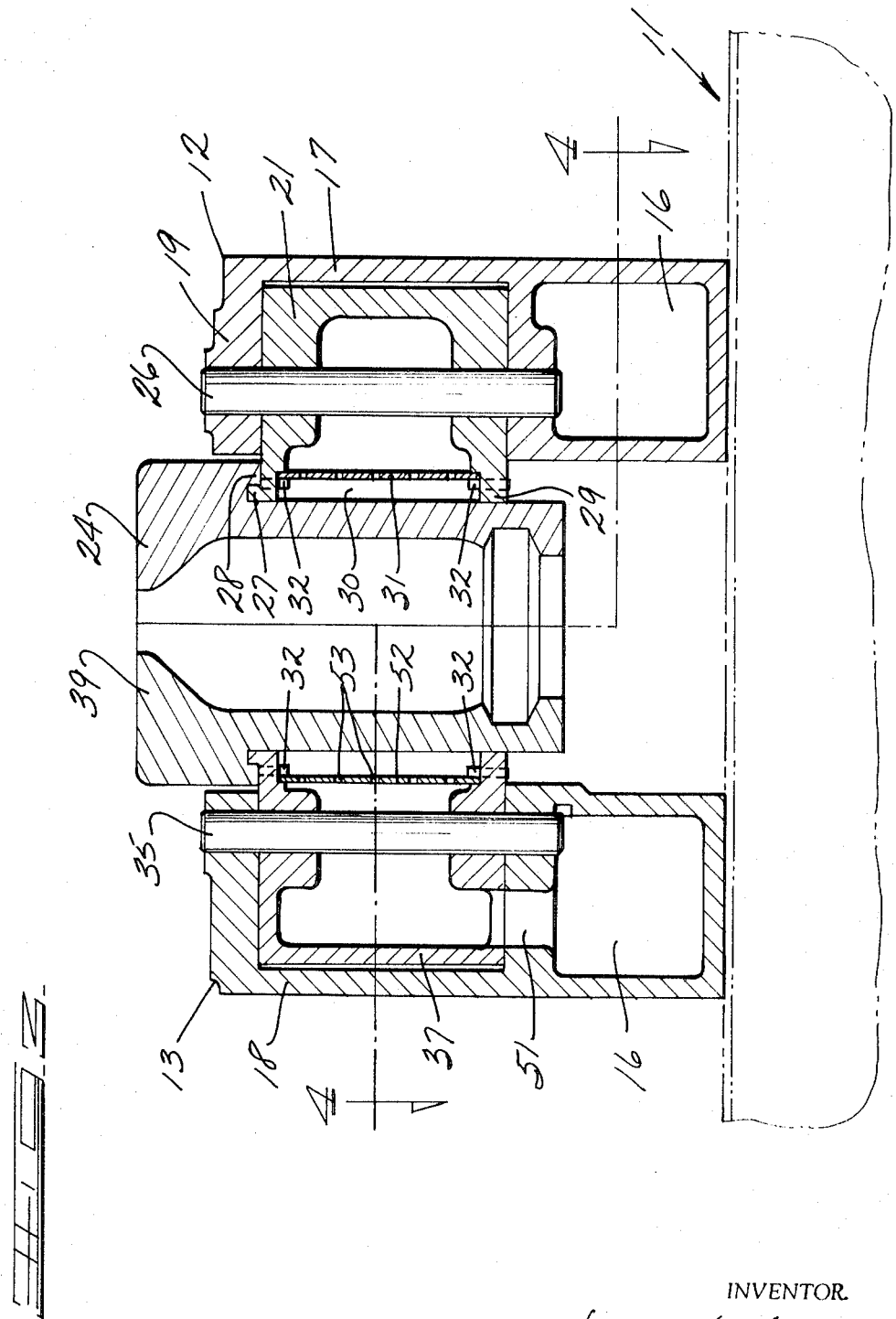
INVENTOR.
Joseph L. Mennitt
BY
D. T. Innis &
E. J. Holler
ATTORNEYS

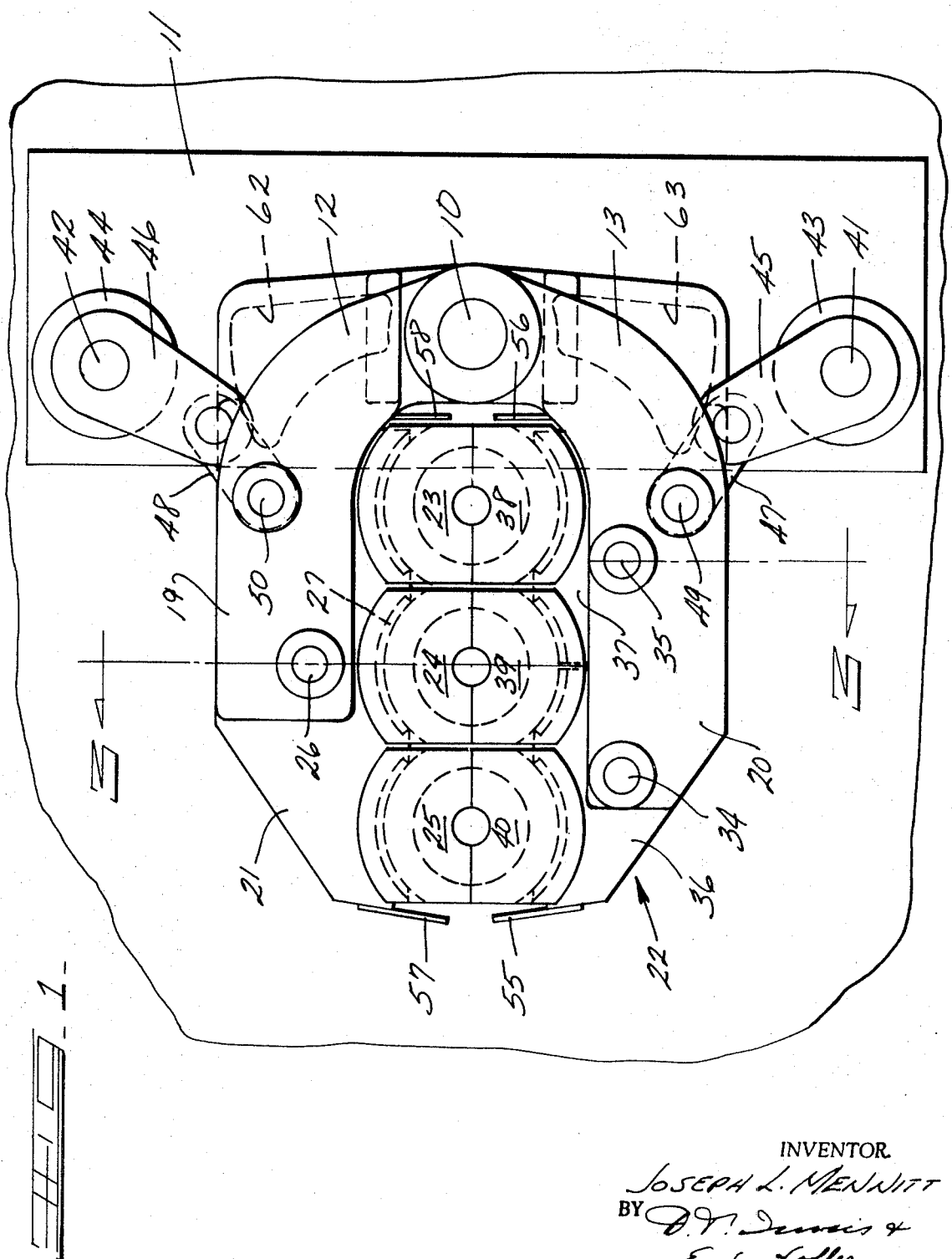

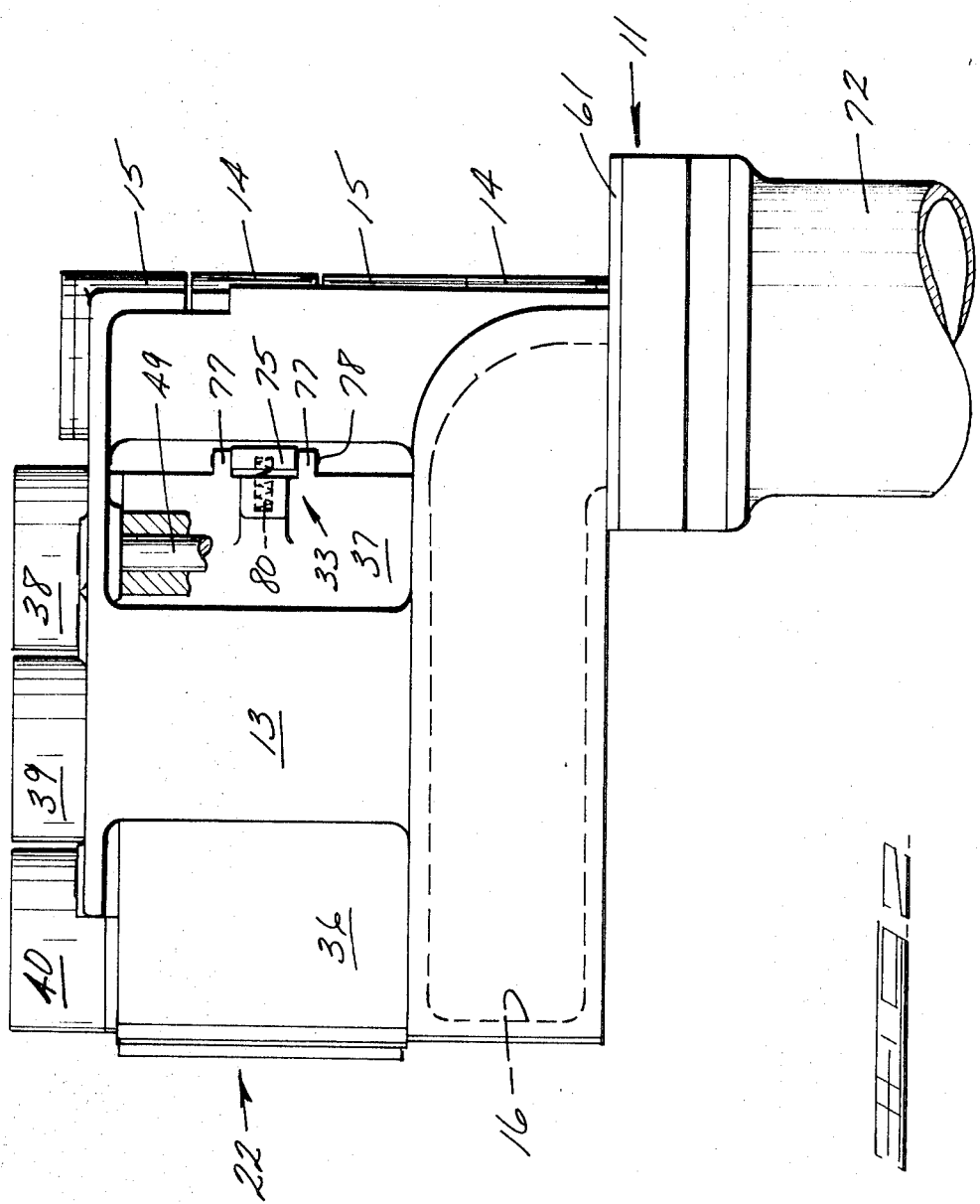

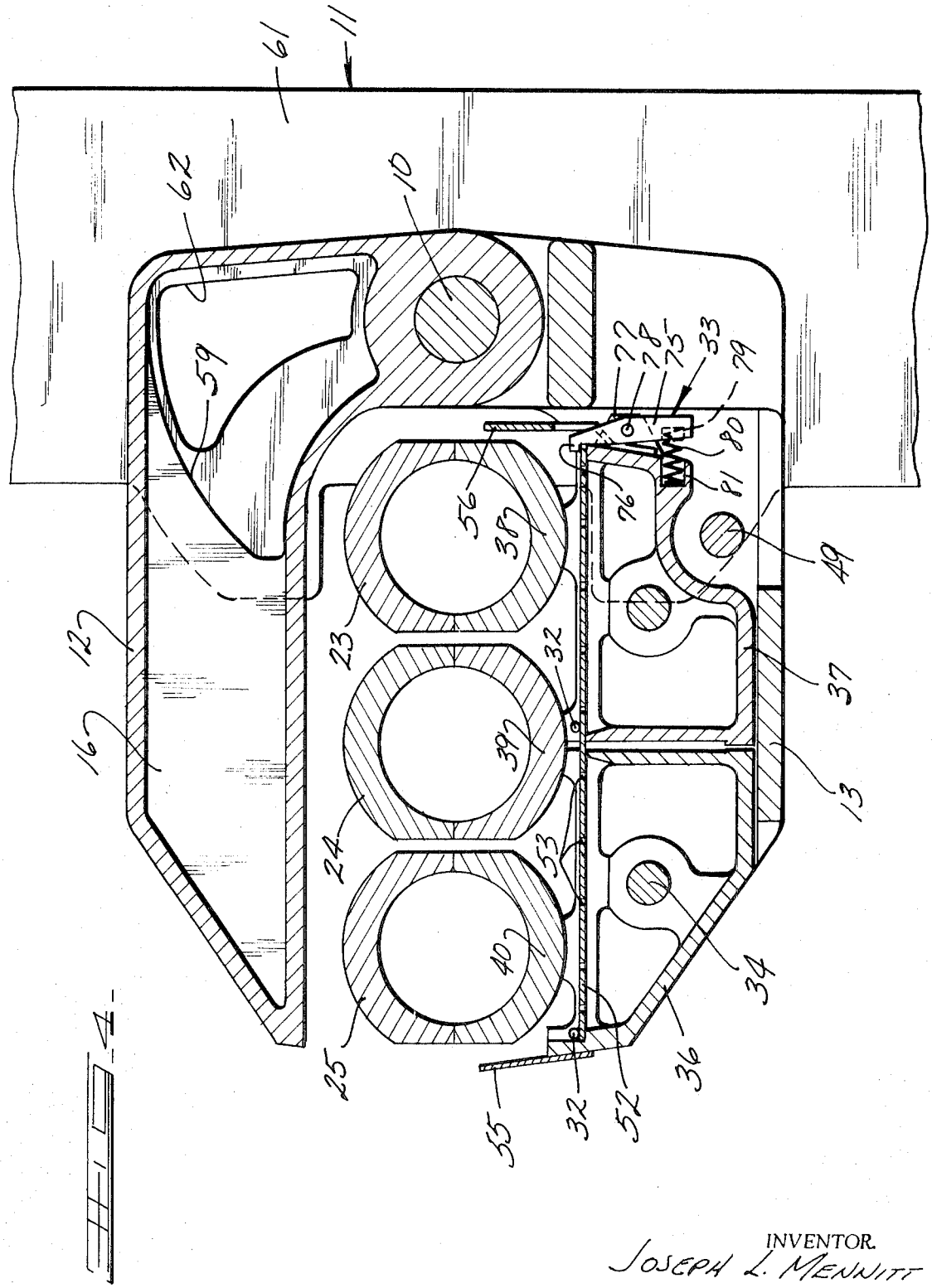

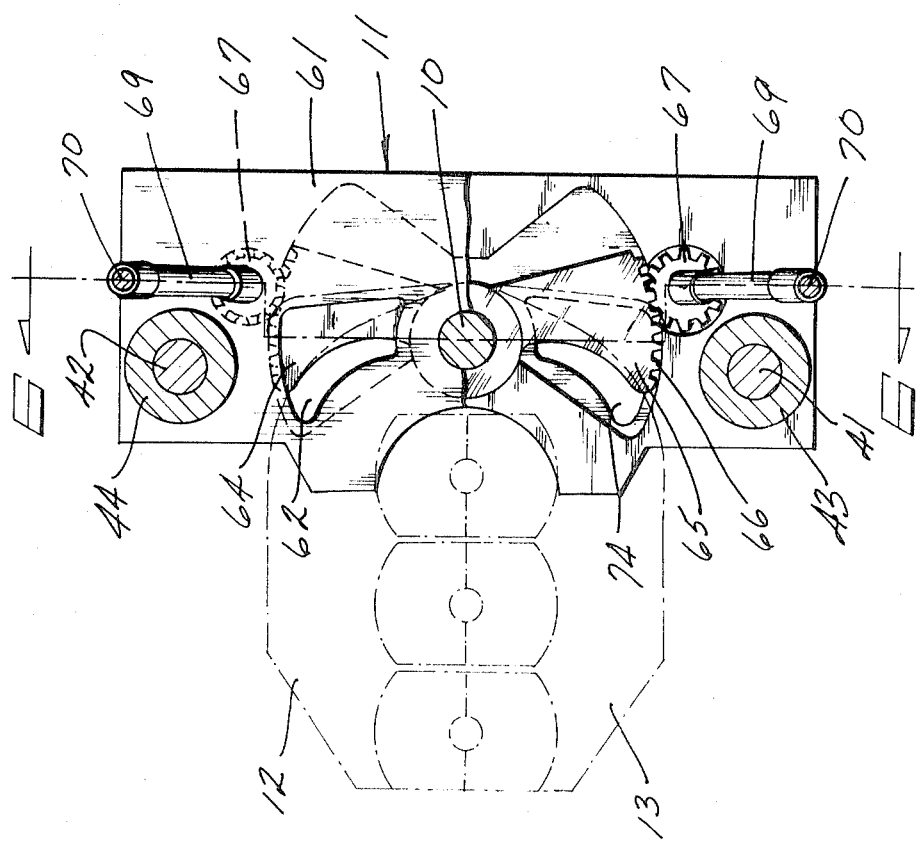

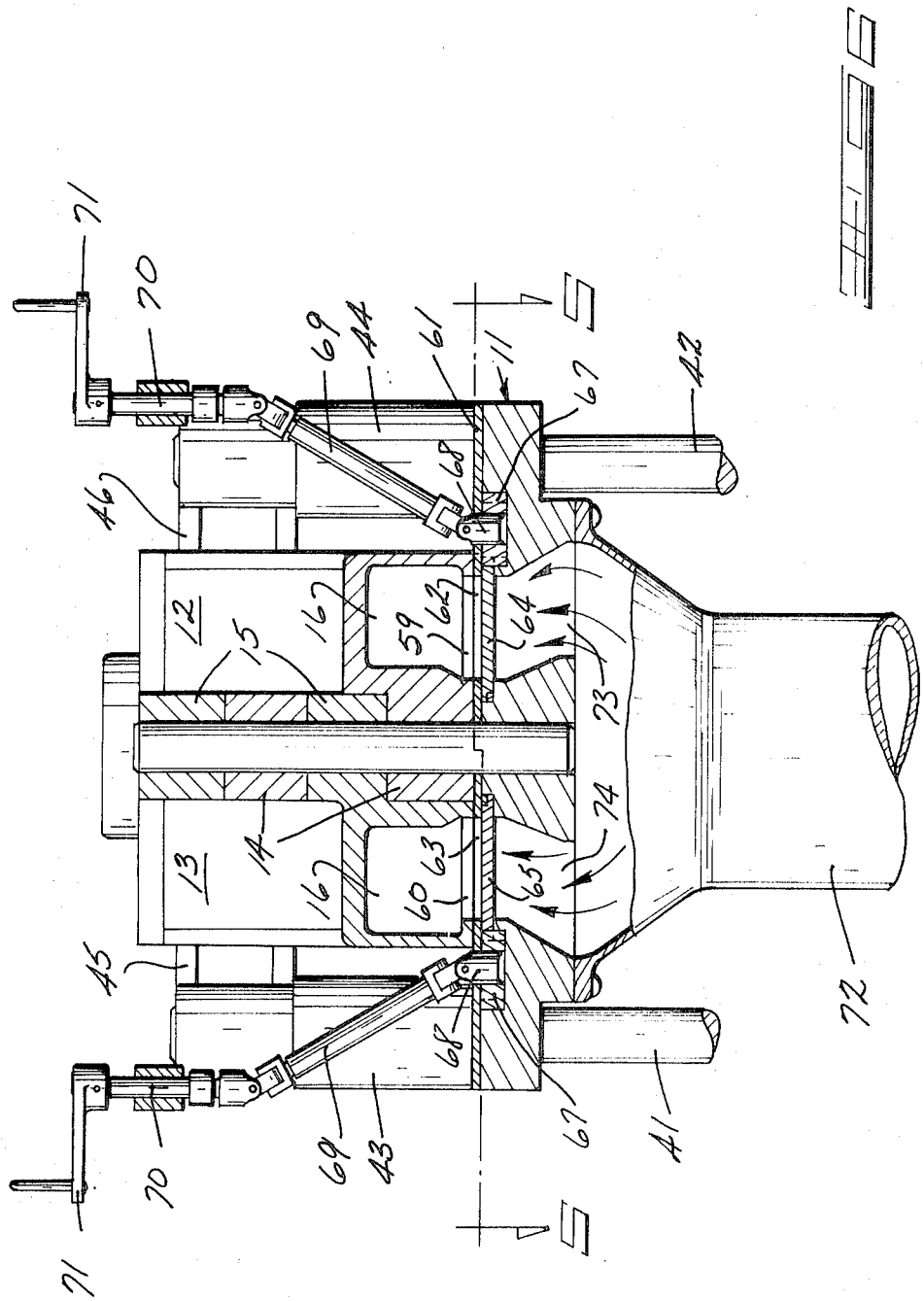

United States Patent Office 3,586,491
Patented June 22, 1971

3,586,491
MOLD COOLING APPARATUS FOR GLASS
FORMING MACHINE
Joseph L. Mennitt, Toledo, Ohio, assignor to
Owens-Illinois, Inc.
Filed Apr. 23, 1969, Ser. No. 818,606
Int. Cl. C03b 9/14, 9/38
U.S. Cl. 65—265       9 Claims

ABSTRACT OF THE DISCLOSURE

The supporting and cooling of blow molds on a glass forming machine in which cooling air is introduced into the chambers of hollow blow mold arms with the air being directed against the backs of plural mold halves. The mold halves are physically mounted on hollow holders with interchangeable cooling plates interposed the hollow holder and the backs of the molds so as to distribute the air in a selected pattern. The air, as it is introduced into the mold arms, is controlled by the setting of baffle plates, with the air moving from the arms into the mold holders.

BACKGROUND OF THE INVENTION

This invention is directed to the problem of supporting a plurality of blow molds, in particular three, for opening and closing movement with respect to each other and providing mechanism in association therewith for cooling the molds. With the advent of glass forming machines which produce plural bottles during each operation of the machine, it has become increasingly necessary to provide adequate means for cooling the molds. This is true both from the standpoint that plural molds, operating in proximity, tend to run hotter and also from the standpoint that machine cycles are continuously being speeded up so that each blow mold must, of necessity, be exposed to hot parisons more frequently than has been the case in the past.

DESCRIPTION OF PRIOR ART

It has been the practice in the past to support blow molds on spaced hangers which effectively leave the non-glass contacting surface of the molds relatively uncovered and provide cooling air from wind boxes or open-ended air conveying tubes which direct air to the backs of the molds. This arrangement is somewhat unsatisfactory from the standpoint that the flow of cooling air is not controlled as to its direction and impingement on the molds so as to make the most effective use thereof. It is common practice to provide more closely controlled cooling arrangements for parison molds since this is the point in the cycle of forming a container when the greatest amount of heat is extracted from the charge of molten glass. Blow molds, by and large, have been cooled in a somewhat haphazard manner, with little thought given to providing a controlled cooling to the molds.

SUMMARY

This invention is directed to apparatus for supporting and cooling glass forming molds, in particular blow molds. The complementary blow mold halves are mounted on hangers which in turn are supported by the usual hinged mold arms. Cooling air is introduced through the bottom of the mold arms in a controlled manner and conveyed from the arms into specifically designed mold hangers where the air exits through a plate having a pattern of holes therethrough, lying in juxtaposition with respect to the mold halves carried by the hangers or brackets.

DESCRIPTION OF THE DRAWINGS

FIG. 1 is a top plan view of the blow mold apparatus of the invention;

FIG. 2 is a side elevational view of the blow molding apparatus of FIG. 1, with one operating link broken away;

FIG. 3 is a cross-sectional, elevation view taken at line 3—3 of FIG. 1;

FIG. 4 is a cross-sectional view taken at line 4—4 of FIG. 3;

FIG. 5 is a cross-sectional view taken at line 5—5 of FIG. 6; and

FIG. 6 is a cross-sectional view taken at line 6—6 of FIG. 5.

With particular reference to the drawings, a detailed description of the apparatus of the invention is provided. Particular emphasis is being placed on the mold supporting and cooling arrangement of the invention. Blow molds, or more particularly mold halves, are conventionally supported so as to be capable of an opening and closing motion relative to each other, keeping in mind the fact that when a container is blown into final, bottle form, the neck of the container is normally smaller than the body portion, thus requiring that the molds be split or capable of opening so as to permit removal of the finished container.

A main, vertically extending post 10 has its lower end fixed within a base assembly 11. A pair of mold arms 12 and 13 are provided with bushings 14 and 15 respectively which surround the post 10 and serve to, in effect, hingedly mount the arms relative to the post 10.

The lower portion of each mold arm takes the form of a substantially hollow cavity 16 extending generally horizontally throughout the length of the arm. Vertical walls 17 and 18 extending upwardly above the cavity portions 16 of the arms 12 and 13 support inwardly turned upper wall portions 19 and 20. The inwardly turned portions 19 and 20, in combination with the walls of the cavity forming portions of the arms, define a generally C-shaped casting within which mold holders or brackets 21 and 22 are positioned.

With particular reference to FIGS. 1 and 3, the mold holder 21 is a single member serving to support three mold halves 23, 24 and 25. The mold holder 21 is pivotally supported within the arm 17 by a pin 26 which extends vertically therethrough with its ends seated within openings formed in the arm portion 19 and the upper wall of that portion of the arm forming the cavity 16. The mold holder 21 is hollowed out throughout a substantial portion of its length and serves as a cooling air manifold chamber. The holder 21, as best shown in FIG. 3, has a portion thereof which extends inwardly beyond the dimensions of the arm 17, with the inwardly extending portion 27 at the top thereof being turned upwardly and having an arcuate configuration.

The upwardly turned portion 27 serves, in cooperation with a similar, arcuately configured, downwardly turned portion 28 of the mold halves 23–25, to provide a hanger arrangement for supporting the mold half relative to the holder 21. The lower, side wall of the mold abuts an arcuate surface 29 extending inwardly from the holder 21. It should be understood that all of the mold halves 23–25 are supported in this manner.

Thus it can be seen that the hollow holder 21 has an opening 30 facing in the direction of the molds that are hanging therefrom. This opening 30 is closed by the positioning of a plate 31 extending the full length of the opening formed in the holder 21. The plate 31 is, generally, loosely retained within the opening 30 by pins 32 fixed to portions 27 and 29 of the holder 21. The end of the plate 31, which is remote from the post 10, abuts the end of the mold holder 21 and thus is prevented from moving in that direction. The opposite end or that end which is closest to the post 10 is retained in its position by a releasable latch mechanism, generally designated 33.

The mold arm 13 is somewhat longer than mold arm 12 and is provided with a pair of vertical pins 34 and 35. The pivot pins 34 and 35 are carried by the mold arm 13 and serve as pivotal mounting means for the mold supporting bracket, generally designated 22.

As can be seen when viewing FIGS. 1 and 4, the bracket 22 is comprised of a pair of mold holders 36 and 37 which together form the structure for supporting the other mold halves 38, 39 and 40. The holder 36 individually supports the mold half 40 and serves, in effect, to support half of the mold 39. In the same manner the mold holder 37 individually supports the mold half 38 and, in effect, half of the mold 39. The two-piece arrangement of the pivoted mold holders 36 and 37, in relation to the single pivoted mold holder 21, serves to assure equal closing forces to the three molds upon the hinged movement of the mold arms into closing relationship.

In the operation of the apparatus, the mold arms 12 and 13 are actuated by a pair of operating shafts 41 and 42 which extend vertically upward through the base assembly or base member 11 and through spacer bushings 43 and 44. The upper ends of the shafts 41 and 42 are keyed to rock arms 45 and 46 respectively. The rock arms 45 and 46, in turn, are pivotally connected at their outer ends to a pair of connecting links 47 and 48, with the links being pivotally connected to pins 49 and 50. The pins 49 and 50 are fixed to the arms 13 and 12 respectively. Thus it can be seen that mold opening and closing is effected by rotation of the shafts 41 and 42. The rock arm 45 will be rotated in a clockwise direction and arm 46 rotated in a counter-clockwise direction to open the molds. Thus, acting through the links 47 and 48 and pins 49 and 50, the mold arms 12 and 13 are hinged apart about the axis of the post 10.

As can best be seen when viewing FIGS. 3 and 4, the mold bracket 22, comprised of the mold holders 36 and 37, forms cavities which have openings facing in the direction of the back sides of the molds 38, 39 and 40. As previously described, the arms 12 and 13 form chambers or cavities 16 which extend substantially along the full length of the arms, and as can be seen in FIG. 3, the cavity 16 communicates through an opening 51 to the cavity formed in the mold holder 37. In a like manner the cavity 16 of the arm 13 will communicate through similar means with the cavity formed in the holder 36. Thus cooling air under pressure within the cavity 16 of the arm 13 will be fed into both of the holders 36 and 37. A single plate 52 extends across the face of the cavities formed in the holders 36 and 37 serving to close their open faces.

The plate 52 is provided with a plurality of holes or apertures 53 providing a selected pattern to permit the flow of air outwardly against the back sides of the mold halves to effect efficient cooling. The plate 52 is a single plate extending substantially the full length of the arm 13 and is loosely retained with respect to the arm such that the holders 36 and 37 may pivot independently to a limited extent about their mounting pins 34 and 35. It should be understood that the amount of adjustment between the mold halves upon closing is relatively small; however, it is important that all of the mold halves be closed with substantially the same closing force. This is assured by permitting limited rocking movement of the holders 36 and 37 and also by the fact that the other single piece holder 21 has limited rocking movement of its own relative to its mounting pin 26.

As the air exits from the holders 21, 36 and 37, there is a tendency for the air to escape at the ends of the molds 40 and 38 without providing sufficient cooling at the exposed ends of these mold halves. In order to confine the air flow so that it will sweep over the ends of the mold halves 40 and 38, a pair of vertical plates 55 and 56 are connected at opposite ends of the holders 36 and 37 and extend outwardly into position closely adjacent to the mold halves. In the same manner, a pair of deflecting plates 57 and 58 are provided on the mold holder 21 to effectively perform the same function as the plates 55 and 56.

As would be expected, the mold arms 12 and 13, in the pivotal movement, slide relative to the base assembly 11 and in order to feed air into the cavity 16, openings 59 and 60 are provided in the bottom wall of the arms 12 and 13. These openings have the configuration best illustrated in FIG. 4.

The base assembly 11 is provided with an upper wear plate 61 which has a pair of cooling air openings 62 and 63 therethrough. The wear plate 61 serves as the bearing surface upon which the arms 12 and 13 may slide as they are pivoted into open and closed position. The wear plate 61 also serves as the retainer for a pair of arcuate dampers or slide valves 64 and 65. The dampers 64 and 65 are positioned within arcuate cutouts or recesses formed in the upper surface of the base assembly 11, and are slidable within the recesses. The two dampers slide in an arc about the retaining boss for the post 10 where it is held in the base assembly. Both of the dampers are provided with gear teeth 66 along their arcuate outermost portions, with these gear teeth being in engagement with pinions 67.

The pinions 67 are seated within a pair of openings formed in the upper surface of the base assembly 11 and are retained in these positions by the fact that their pinion shafts 68 extend through openings in the wear plate. The shafts 68 of the pinions 67 are hingedly connected to intermediate drive links 69. A pair of upper drive shafts 70 are connected by a universal joint to the shafts 68. Both of the shafts 70, shown in FIG. 6, are provided with cranks 71 for effecting rotation of these shafts and thus provide a means for selectively adjusting the position of the damper plates 65 relative to the openings 62 and 63 formed in the wear plate 61.

An air header 72 is connected to the underside of the base assembly 11 and serves as a cooling air supply. As best shown in FIG. 6, the base assembly 11 is provided with a pair of air passages 73 and 74 which are in registry with the openings 63 and 62 formed in the wear plate 61. The configuration of these air passages, as shown in FIGS. 5 and 6, is such that feeding of cooling air to the chambers or cavities 16 formed in the mold arms is continuous, regardless of whether the arms are open or closed. The adjustability provided by the arrangement of the dampers serves to provide a control on the quantity of coolant being supplied to each individual mold arm.

For particular forming operations where it is necessary that preselected pattern of coolant be impinged on the backs of the molds, the plates 31 and 52 may be quickly and easily replaced by other plates having different selected hole patterns formed therethrough.

The latch mechanism serving to retain the plates 31 and 52 in position, takes the form, as shown in FIG. 4, of a latching finger 75, having a latching end 76, pivoted to a bracket 77 at 78. The finger 75 at its end opposite the latching end is provided with a recess 79 serving as the seat for a compression spring 80, with the other end of the compression spring seated within a tapped opening 81 formed in the casting of the mold holder 37.

An identical pin and latch arrangement is provided on the other mold holder 21 for retaining the opposite plate 31. By this arrangement, the finger 75, when depressed against the spring, serves to pivot the latching end 76 an amount sufficient to permit lateral movement of the plate 52, which is only loosely retained in its position, thus permitting the plate to be removed and replaced by a plate of similar dimension, but with a different cooling pattern.

I claim:

1. Apparatus for supporting and cooling glass forming molds comprising a pair of complementary mold arms, means mounting said mold arms for hinging movement toward and away from each other, a mold-half supporting bracket pivotally mounted to one arm, a pair of mold-half supporting brackets pivotally mounted to the other arm, a plurality of mold halves carried by said brackets and closing in a vertical plane defining a mold parting line, said brackets being provided with internal, coolant carrying, cavities and open along the side thereof facing the mold halves, said mold arm having cooling passages formed therein with upper openings, said brackets overlying and communicating with the openings of said passages in said arms, a single flat perforate plate having a preselected pattern of openings therethrough extending along the length of each arm and closing the open face of each mold bracket for controlling the distribution pattern of coolant impinging on the mold halves, an elongated, substantially flat plate attached to each end of each of said brackets, extending generally in the direction of said mold parting line of said mold, and having its free end closely spaced from the ends of the molds.

2. The apparatus of claim 1, further including a base member underlying the hinged end of each arm, said base member having a pair of openings therethrough in alignment with openings formed in the underside of said arms, coolant supply means connected to said base member, and adjustable valve means positioned on said base member for regulating the size of the opening in said base member to control the volume of coolant passing into the mold arms.

3. The apparatus of claim 2, wherein said valve means comprises two separate valves and means connected to each of said valves for selectively adjusting the opening of each said valve independent of the other to regulate the volume of coolant supplied to each arm.

4. The apparatus of claim 2, wherein said valves comprise an apertured sector panel overlying said opening in said base member and having gear teeth formed along one edge thereof, pinion means in engagement with said gear teeth, and means connected to said pinion for rotating said pinion to effect sliding movement of said sector panel.

5. The apparatus of claim 1, further including quick-release latching means carried by each arm for retaining said plate in position.

6. The apparatus of claim 5, wherein said quick-release latching means comprises a lever mounted for pivotal movement on said mold supporting brackets at the end thereof adjacent the mold hinge and spring means biasing one end of said lever into overlying relationship with respect to said perforate plates.

7. The apparatus of claim 5, further including a base member underlying the hinged end of each arm, said base member having a pair of openings therethrough in alignment with openings formed in the underside of said arms, coolant supply means connected to said base member, and adjustable valve means positioned on said base member for regulating the size of the opening in said base member to control the volume of coolant passing into the mold arms.

8. The apparatus of claim 7, wherein said valve means comprises two separate valves and means connected to each of said valves for selectively adjusting the opening of each said valve independent of the other to regulate the volume of coolant supplied to each arm.

9. The apparatus of claim 7, wherein said valves comprise an apertured sector panel overlying said opening in said base member and having gear teeth formed along one edge thereof, pinion means in engagement with said gear teeth, and means connected to said pinion for rotating said pinion to effect sliding movement of said sector panel.

References Cited

UNITED STATES PATENTS

| | | | |
|---|---|---|---|
| 1,632,992 | 6/1927 | Bragg | 65—355 |
| 1,633,028 | 6/1927 | La France | 65—355 |
| 2,402,475 | 6/1946 | Waterbury et al. | 65—355 |
| 2,751,715 | 6/1956 | Denman | 65—356 |
| 3,024,571 | 3/1962 | Abbott et al. | 65—356X |
| 3,137,560 | 6/1964 | Ketcham | 65—356 |
| 3,178,276 | 4/1965 | Kawecka et al. | 65—356 |
| 3,472,639 | 10/1969 | Mumford | 65—360X |

FRANK W. MIGA, Primary Examiner

U.S. Cl. X.R.

65—355, 356, 357, 360